April 13, 1965 TAKAAKI TAMURA 3,177,631
PROCESS FOR A CONTINUOUS SEPARATION OF GASES BY ADSORPTION
UTILIZING FLUIDIZED AND MOVING BEDS
Filed Oct. 3, 1961
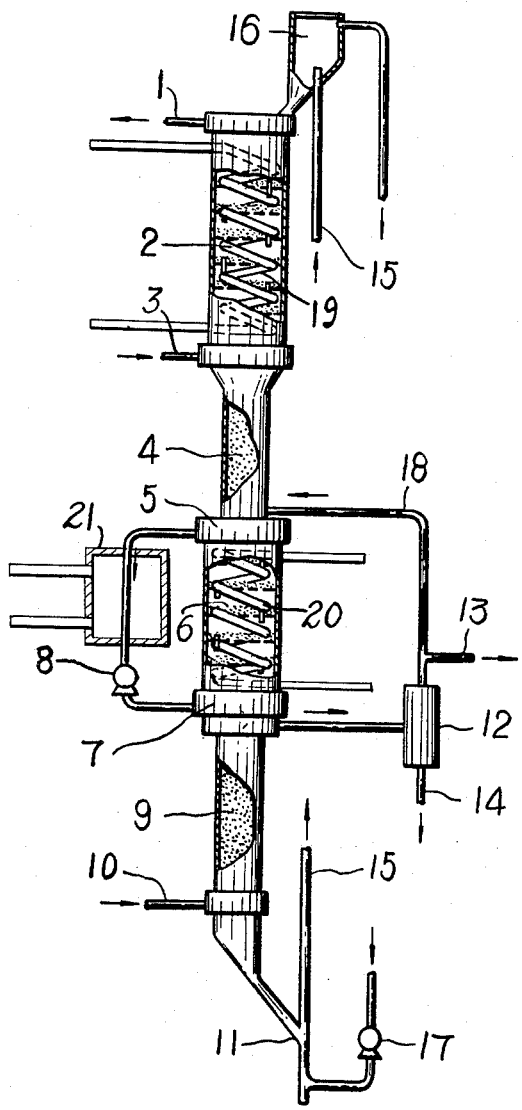
INVENTOR.
BY Takaaki Tamura
Wenderoth, Lind and Ponack,
attorneys United States Patent Office  3,177,631
Patented Apr. 13, 1965

3,177,631
PROCESS FOR A CONTINUOUS SEPARATION OF GASES BY ADSORPTION UTILIZING FLUIDIZED AND MOVING BEDS
Takaaki Tamura, Tokyo, Japan, assignor to Kogyokaihatsu Kenkyujo, Tokyo, Japan
Filed Oct. 3, 1961, Ser. No. 142,716
Claims priority, application Japan, June 23, 1961, 36/21,891/61
9 Claims. (Cl. 55—28)

This invention relates to the process for separating continuously a desired gas component or desired gas components from a quantity of a gas mixture by using a solid adsorbent.

More particularly, the invention relates to the process for separating gases by circulating forcibly a granular adsorbent through a multi-stage fluid-bed type cooling and adsorbing zone, a moving-bed type concentrating zone, and a desorbing zone consisting of a combination of a fluidized bed zone for heating and a moving-bed zone for stripping in that order, by cooling the high-temperature regenerated adsorbent and at the same time adsorbing a desired component or desired components on the adsorbent from a feed-gas mixture which is passing upwardly and counter-currently to the adsorbent in said cooling and adsorbing zone, by increasing the concentration of the desired component or the components on the adsorbent in said concentrating zone by introducing a reflux gas into said zone from a lower part and contacting it counter-currently with the adsorbent, by heating the adsorbent in the fluidized bed zone of said desorbing zone to desorb a part of the desired component or components and then stripping the desired component or components completely in the moving-bed zone of said desorbing zone by introducing a stripping gas such as steam into the moving-bed zone from a lower part, by recycling the regenerated adsorbent into said adsorbing zone and at the same time withdrawing a gas mixture of the desired component or components and the stripping gas from an upper part of the moving-bed desorbing zone, and by recovering the desired component or components as a product after removing the stripping gas by means of a suitable separator while sending a part of the separated component or components into said concentrating zone as the reflux gas.

Hitherto, a hypersorption process and a fluid-char process have been presented as a continuous separation process by circulating a granular adsorbent. However, in these known processes, a moving-bed system only or fluidized bed system only has been adopted each as the operation system of the adsorbent in the main parts of the processes, i.e., the adsorbing zone, the concentration zones, and the desorbing zones.

In order to carry out such continuous separation processes effectively and smoothly, a feed-gas mixture to be separated must be brought into contact counter-currently with an adsorbent while maintaining the flowing velocities of the gas mixture and the adsorbent and the concentrations of components in the gas mixture and components adsorbed on the adsorbent uniformly in each part of the adsorbing zone, the concentrating zone, and the desorbing zone in planes perpendicular to the flowing directions of the gas stream and the adsorbent, and also the heat of adsorption in the adsorbing zone must be removed and the heat corresponding to the desorption and sensible heat of the adsorbent in the desorbing zone must be supplied so as to maintain the adsorbing zone at low temperature and the desorbing zone at a high temperature.

However, while the moving-bed system has the advantage that a sufficient concentration gradient of an adsorbed component can be formed along the longitudinal direction in a single moving-bed unit, there occurs the following difficulty as the capacity of the system or the diameter of the column for the system increases. Namely, since the heat-conductive area of the wall of the column per unit volume of the adsorbent decreases relatively besides the disadvantage that the heat conductivity in a moving-bed system is comparatively low, the heat conduction between the adsorbent and the outside is lowered more, which makes sufficient heat transfer difficult. Further, in the moving-bed system, the gas velocity cannot be increased beyond a definite value for preventing fluidization.

Because of the limitations in the diameter of the column and the gas velocity in the moving-bed system, the capacity of the unit apparatus for the system is inevitably restricted, and it becomes difficult to form a stable equilibrium throughout each zone except when the system is operated under pressure or when the system has a comparatively low heat of adsorption and heat of desorption.

In the fluidized bed system, an adsorbent can be completely mixed with the feed-gas mixture to be treated and there is no restriction in capacity as in the above-mentioned case of the moving-bed system since the gas velocity and the heat conduction are much higher than those in the case of the moving-bed system. However, there are drawbacks in that the gas stream must have a velocity in a definite range in order to maintain the adsorbent in a fluidized state and the concentration gradient of a desired gas component cannot be formed in a one-stage fluidized layer, which are inconvenient in the cases of concentration, stripping, etc., and consequently reduce the efficiency. Therefore, the fluidized bed system can be applied to only limited objects such as a removal of specific components (e.g. moisture) from a gas mixture.

Accordingly, a principal object of the present invention is to provide an improved process for separating gases effectively by adsorption. A further object of the invention is to provide an improved process for separating gases by adsorption in which a large capacity system can be adopted without decreasing the efficiency. Another object of the invention is to provide an improved continuous process for separating gases by adsorption in which a wide variety of feed materials can be treated.

Other objects and advantages of the present invention will more fully appear from the following detailed description of a preferred embodiment thereof.

The inventor has studied various adsorption processes for continuous recovering of hydrocarbons slightly contained in a quantity of a gas mixture (e.g., a thermally-cracked gas), and found that the adsorption and the concentration could be carried out effectively by combining a fluidized bed system and a moving-bed system in a larger capacity than the conventional processes as mentioned above, and that by combining a fluidized bed heating system and a moving-bed stripping system in a desorbing zone, the adsorbent could be sufficient heated and the stripping can be carried out effectively by using a small amount of a stripping gas.

In accordance with the present invention, a feed-gas mixture is brought into contact in the fluidized state with a circulated adsorbent which has previously regenerated to adsorb a desired component (of course, two or more of gas components can be recovered by the process of the present invention, but for convenience' sake the following explanation refers to the recovering of one component hereinafter) on the adsorbent in a multi-stage fluidized bed adsorbing zone by introducing the adsorbent into the adsorbing zone from the top and the feed-gas stream below the zone. (In this process, the system may be cooled, if necessary, by means of cooling pipes placed inside and (or) outside of the fluidized bed zone.)

After the desired component in the feed-gas mixture is adsorbed on the adsorbent together with other component in the adsorbing zone until an equilibrium state is formed corresponding to the partial pressure of each gas component, the adsorbent is introduced from the bottom of the adsorbing unit into a moving-bed concentrating zone where the adsorbent is brought into contact counter-currently with a reflux gas mainly consisting of the desired component (almost 100%) to purge undesired adsorbed components from the adsorbent and at the same time to increase the concentration of the desired components on the adsorbent by being adsorbed on the adsorbent instead until a saturated state is obtained. Since the amount of the gas stream ascending through the concentrating zone may be one corresponding to the amount of the reflux gas to saturate the descending adsorbent or the amount corresponding to the purged gas, the gas velocity is low.

The adsorbent saturated with the desired component is then introduced into a desorbing zone that consists of a fluidized-bed heating zone and a moving-bed stripping zone. The fluidized bed zone may be a single-stage type or a multi-stage type and the adsorbent is fluidized by introducing a gas below the fluidized bed zone, the gas being withdrawn from the upper part of the fluidized bed zone and circulated forcibly by means of a gas blower and, if necessary, through a heater. The adsorbent is heated effectively in the fluidized bed zone by means of heating pipes placed in the fluidized bed zone or by the high temperature circulating gas to desorb a part of the desired component adsorbed on the adsorbent and then is transferred into the moving-bed stripping zone. There it meets an upward stream of a stripping gas liberating the adsorbed desired component completely and at the same time being regenerated. As a moving-bed system is adopted in the stripping process, the concentration of the desired component takes a definite gradient along the longitudinal direction in the moving-bed unit and the adsorbent is always brought into contact with a fresh or pure stripping gas at the lowest part of the stripping zone, which results in completing the stripping and regenerating processes. Also, a moving-bed system has a drawback that the amount of the passing gas is small, but this point is, on the contrary, utilized effectively in the stripping process of this invention. In other words, since the stripping process can be carried out by using a very small amount of a stripping gas, the cost is reduced and the separation of the stripping gas from the desired component is simplified.

The described gas mixture consisting of the stripping gas and the desired component is withdrawn from the upper part of the moving-bed unit or from a suitable part of a conduit for circulating the gas to fluidize the adsorbent in the fluidized bed heating zone, and after removing the stripping gas from the gas mixture by a suitable means as, e.g., condensation, a part of the purified desired component is returned to the concentrating zone as the reflux gas and the remainder is recovered as the product.

By the process of the present invention, as the adsorbing process, the concentrating process, and the heating and stripping process can satisfy broad necessary conditions independently of each of other, the variety of feed materials can be enlarged, the capacity of the system can be increased, and the process can be operated easily. Also, by the process of the invention, as the gas velocity is high, the heating or cooling area can be reduced in the adsorbing zone, and the concentrating and stripping processes can be carried out with a high efficiency by small amounts of a reflux gas and a stripping gas respectively, the installation for the separation process of this invention can be compacted without reducing the high efficiency.

To illustrate the invention with more particularity, a schematic diagram of a preferred process of the invention is shown in the drawing.

Referring now to the drawing, a feed-gas mixture is fed into a multi-stage fluidized bed adsorbing zone 2 through an inlet 3, passed upwardly through the zone 2, and withdrawn through an outlet 1 from the system. A granular adsorbent which is supplied from the top is passed downwardly through the adsorbing zone 2 while being fluidized in each stage and adsorbing a desired component from the feed-gas mixture. If desired or necessary, the adsorbent may be cooled by cooling device 19. The adsorbent is then introduced in a moving-bed concentrating zone 4, where the adsorbent is concentrated with a reflux gas which is supplied through a conduit 18 and transferred to a multi-stage fluidized bed heating zone 6 through a sealing device 5 and heated to a desorbing temperature.

In the heating zone 6, the adsorbent is fluidized by a gas stream which is circulated by means of a gas blower 8 through a sealing device 7. A heater 20 may be placed in the fluidized bed zone or, in the alternative, a heater 21 may be located in part of the loop for circulating the gas stream.

The adsorbent heated in the heating zone is transferred to a moving-bed type stripping zone 9 and brought into contact counter-currently with a stripping gas which is introduced into the stripping zone through an inlet 10 to desorb the desired component completely. The adsorbent desorbed or regenerated in the stripping zone is returned to the top of the adsorbing zone 2 through an engager 11 and a lift tube 15 by a lift gas which is blown into the tube by means of a blower 17. A gas mixture of the stripping gas and the desired component desorbed from the adsorbent is introduced into a separator 12 wherein the stripping gas is removed through a conduit 14, a part of the desired component is refluxed into the concentrating zone 4, and the remainder is withdrawn through an outlet 13. The numeral 16 indicates a disengager for the adsorbent and the lift gas.

The invention will be further illustrated by the following example.

EXAMPLE

A feed-gas mixture having components as shown in the Table I was introduced in a fourteen-stage fluidized bed adsorbing unit of 65 cm. in diameter from the lower part of a velocity of 1,100 N m³/hr. and at the same time active carbon was supplied into the unit at 6 tons/hr. from the top. Cooling pipes placed in the six-stages of the fluidized bed unit.

Table I

| Component: | Volume per cent |
|---|---|
| Hydrogen | 51 |
| Nitrogen | 4 |
| Carbon monoxide | 7 |
| Methane | 32 |
| Carbon dioxide | 2.5 |
| Ethylene | 3.5 |

As the temperature of the adsorbing zone was elevated by the heat of adsorption, the temperature was maintained at about 30° C. by passing cooling water through cooling pipes placed in the fluidized-bed zone. The waste gas withdrawn from the upper part of the adsorbing unit had gas components as shown in the following Table II.

Table II

| Component: | Volume per cent |
|---|---|
| Hydrogen | 52.8 |
| Nitrogen | 4.1 |
| Carbon Monoxide | 7.3 |
| Methane | 33.2 |
| Carbon dioxide | 2.6 |
| Ethylene | 0.01 |

The active carbon was heated up to 150° C. in a six-stage fluidized-bed type heating unit containing a heating tube through which saturated steam of 6 kg./cm.² was passed, and then flowed down continuously into a moving-bed type stripping zone at a velocity of 6 tons/hr.

Superheated steam at 160° C. was introduced into the moving-bed zone from below as a stripping gas at a velocity of 40 kg./hr. After removing steam from the desorbed gas mixture by condensation in a separator equipped with a cooling means, the product gas had the components shown in the Table III.

*Table III*

| Component: | Volume per cent |
|---|---|
| Hydrogen | 0 |
| Nitrogen | 0 |
| Carbon monoxide | 0 |
| Methane | 0 |
| Carbon dioxide | 0.2–0.01 |
| Ethylene | 99.5–99.99 |

Active carbon withdrawn from the last moving-bed type stripping zone had the same adsorption capacity as the initial one and therefore was reused by returning it to the top of the adsorbing zone by a gas lift utilizing a part of the waste gas from the top of the adsorbing zone as the lift gas. The total amount of active carbon circulated through the apparatus was 1.1 tons.

What is claimed is:

1. A process for separating gasses continuously by adsorption which comprises downwardly passing a granular adsorbent in series through a multi-stage fluidized bed cooling and adsorbing zone, a moving-bed concentrating zone, a fluidized bed heating zone and a moving-bed stripping zone; cooling the adsorbent and at the same time adsorbing at least one desired component on the adsorbent from a feed-gas mixture which is introduced into the cooling and adsorbing zone at the bottom thereof and removed at the top thereof and being of sufficient velocity to fluidize the flow of adsorbent therein and flows counter-current to said adsorbent in said cooling and adsorbing zone; increasing the concentration of the desired component on the adsorbent in said concentrating zone by introducing a reflux gas into said zone; circulating a hot inert gas at a sufficient velocity in said fluidized bed heating zone to fluidize and heat the adsorbent flowing therein and then stripping the desired component completely in the moving-bed stripping zone by passing a stripping gas into the bottom of said moving bed stripping zone; withdrawing a gas mixture of the desorbed desired component and the stripping gas from said moving bed stripping zone; and separating the stripping gas from the desired gas component while returning a part of the desired component thus separated into the moving bed concentrating zone as the reflux gas.

2. A process in accordance with claim 1 wherein the adsorbent regenerated in the stripping zone is recycled to the top of said adsorbing zone by means of a gas lift.

3. A process in accordance with claim 1 wherein cooling tubes are placed in said multi-stage fluidized bed cooling and adsorbing zone.

4. A process in accordance with claim 1 wherein the adsorbent is fluidized in the fluidized bed heating zone by a gas circulated forcibly by means of a gas blower.

5. A process in accordance with claim 1 wherein a heater is placed in the fluidized bed heating zone.

6. A process in accordance with claim 1 wherein a heater is provided in a recycle conduit for circulating said inert gas through said fluidized bed heating zone.

7. A process in accordance with claim 1 wherein the adsorbent is active carbon and the stripping gas is steam.

8. A process in accordance with claim 1 wherein the stripping gas is separated from the desired gas component by condensation.

9. A process in accordance with the claim 1 wherein the feed-gas mixture is a thermally-cracked gas and the desired component is ethylene.

References Cited by the Examiner

UNITED STATES PATENTS

| 2,448,135 | 8/48 | Becker et al. | 55—99 |
| 2,476,472 | 7/49 | Arnold et al. | 55—61 |
| 2,590,322 | 3/52 | Imhoff et al. | 55—61 |
| 2,616,515 | 11/52 | Berg et al. | 55—60 |
| 2,673,832 | 3/54 | Lassiat | 55—390 |
| 2,722,999 | 11/55 | Bratzler et al. | 55—61 |
| 2,723,000 | 11/55 | Fritz et al. | 55—61 |

REUBEN FRIEDMAN, *Primary Examiner.*

HERBERT L. MARTIN, *Examiner.*